United States Patent [19]

Chaussadas

[11] Patent Number: 4,747,485

[45] Date of Patent: May 31, 1988

[54] CARTON WITH RECESSED ENDS BLANK THEREFOR

[75] Inventor: Jean Chaussadas, Brassioux, France

[73] Assignee: The Mead Corporation, Dayton, Ohio

[21] Appl. No.: 4,509

[22] Filed: Jan. 20, 1987

[30] Foreign Application Priority Data

Jan. 20, 1986 [GB] United Kingdom ................. 8601271

[51] Int. Cl.⁴ ............................................. B65D 65/00
[52] U.S. Cl. .................... 206/427; 206/428; 229/52 B; 229/52 BC; 229/109
[58] Field of Search ....................... 206/139, 427, 428; 229/41 C, 40, 109, 52 B, 52 BC; 220/94 R, 95

[56] References Cited

U.S. PATENT DOCUMENTS

| | | | |
|---|---|---|---|
| 2,001,478 | 5/1935 | Uogt | 229/40 |
| 2,925,213 | 2/1960 | Zukoski | 229/41 C |
| 3,303,986 | 6/1967 | Tanaka | 229/52 B |
| 3,310,219 | 3/1967 | Dlugopolski | 229/52 B |
| 3,346,167 | 10/1967 | Schmidt | 206/427 |
| 4,295,598 | 10/1981 | Calvert | 206/428 |
| 4,382,511 | 5/1983 | Hamelin et al. | 206/427 |
| 4,715,493 | 12/1987 | Dreyfus | 229/52 BC |

FOREIGN PATENT DOCUMENTS

| | | | |
|---|---|---|---|
| 206966 | 12/1986 | European Pat. Off. | |
| 2302244 | 9/1976 | France | 206/427 |
| 680779 | 1/1965 | Italy | 229/107 |
| 680781 | 1/1965 | Italy | 229/107 |

Primary Examiner—David T. Fidei
Attorney, Agent, or Firm—Erwin Doerr

[57] ABSTRACT

A carton accommodating a group of articles disposed in at least three parallel rows (C) in which the arrangement of the articles in rows is such that a void (CR) is present at each end of the carton intermediate the outer rows (RL, RR) of articles. The carton has a top (22, 22a) and a base (12,32; 12a, 32a) interconnected by spaced side walls (14,24); 14a, 24a) thereby forming a tubular structure and end closure panels closing each end of the tubular structure. The end closure panels include a top closure panel (88,88a) hinged to the top which has a portion (94,94a) displaced into the void (CR) and a base end closure panel (50,50a) hinged to the base which has a portion secured to the displaced portion of the top end closure panel within the void. The bottom end closure panel is displaced into the void from a foldable connection (52,52a) to the base which is substantially aligned with opposed endmost articles in the outer rows.

14 Claims, 5 Drawing Sheets

CARTON WITH RECESSED ENDS BLANK THEREFOR

This invention relates to a carton which accommodates a group of articles disposed in at least three parallel rows in which the arrangement of the articles in the rows is such that a void is present at each end of the carton intermediate the outer article rows. The invention also is concerned with a carton blank which is formed from a single sheet of paperboard or like foldable material for forming such a carton.

The carton specifically is formed so that it has recessed ends which are produced during folding of the blank by causing end closure panels to be displaced into the void at each end of the blank. The recessed ends may of themselves provide handle portions by which the carton readily can be grasped. However, more particularly the carton may be adapted to receive a close-fitting encircling band which passes across the recessed ends and there provides a length of the band which may be readily grasped to facilitate portage of the carton.

The voids at each end of the article group are formed by arranging the articles in the or each inner row to have fewer articles than the outermost rows and so that the articles in the or each inner row are each disposed between a pair of adjacent articles in the neighboring outer row.

One aspect of the invention provides a carton accommodating a group of articles disposed in at least three parallel rows in which the arrangement of the articles in said rows is such that a void is present at each end of the carton intermediate the outer rows of articles, the carton comprising a top and a base interconnected by spaced side walls thereby forming a tubular structure and end closure panels closing each end of the tubular structure, said end closure panel hinged to said top and having a portion displaced into said void and a bottom end closure panel hinged to said base and having a portion secured to said displaced portion of the top end closure panel within said void, characterized in that said bottom end closure panel is displaced into said void from a foldable connection to said base which is substantially aligned with opposed endmost articles in said outer rows.

Another aspect of the invention provides a carton blank for packaging a group of articles disposed in at least three parallel rows in which the arrangement of the articles in said rows is such that a void is present at each end of the carton intermediate the outer rows of articles, the blank being formed from a single sheet of foldable material and comprising a first base panel, at least one first side wall panel, a top panel, at least one second side wall panel, and a second base panel hinged one to the next along fold lines disposed so as to allow said blank to be formed into a tubular structure, said first base panel, said side wall panels and said top panel all having end closure panels at each of their opposite ends for closing the ends of the tubular structure, characterized in that said end closure panel hinged to said first base panel comprises a central panel and a wing panel hinged to each of the opposed side edges of said central panel, each wing panel including a pair of hinged flaps for securing the base end closure panel to the remaining end closure panels.

An embodiment of the invention will now be described, by way of example, with reference to the accompanying drawings, in which.

Figure 3:
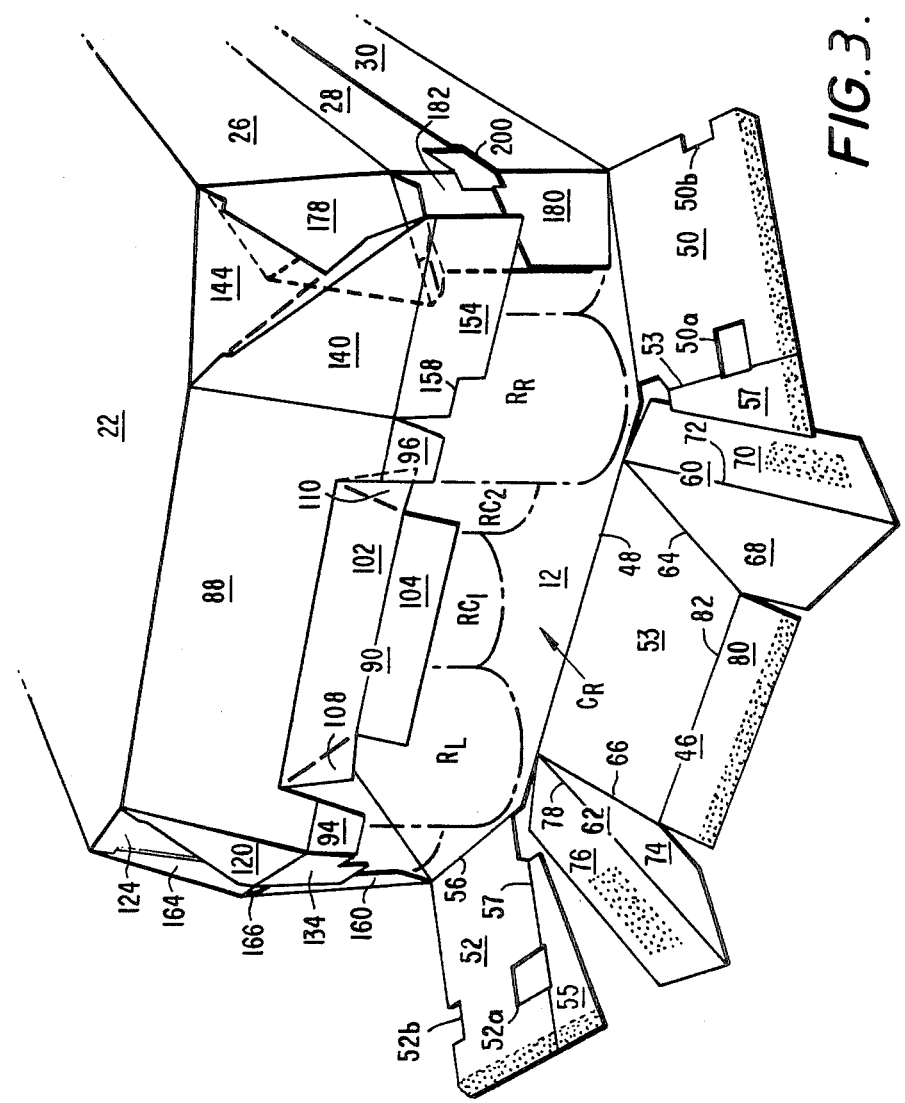
Figure 4:
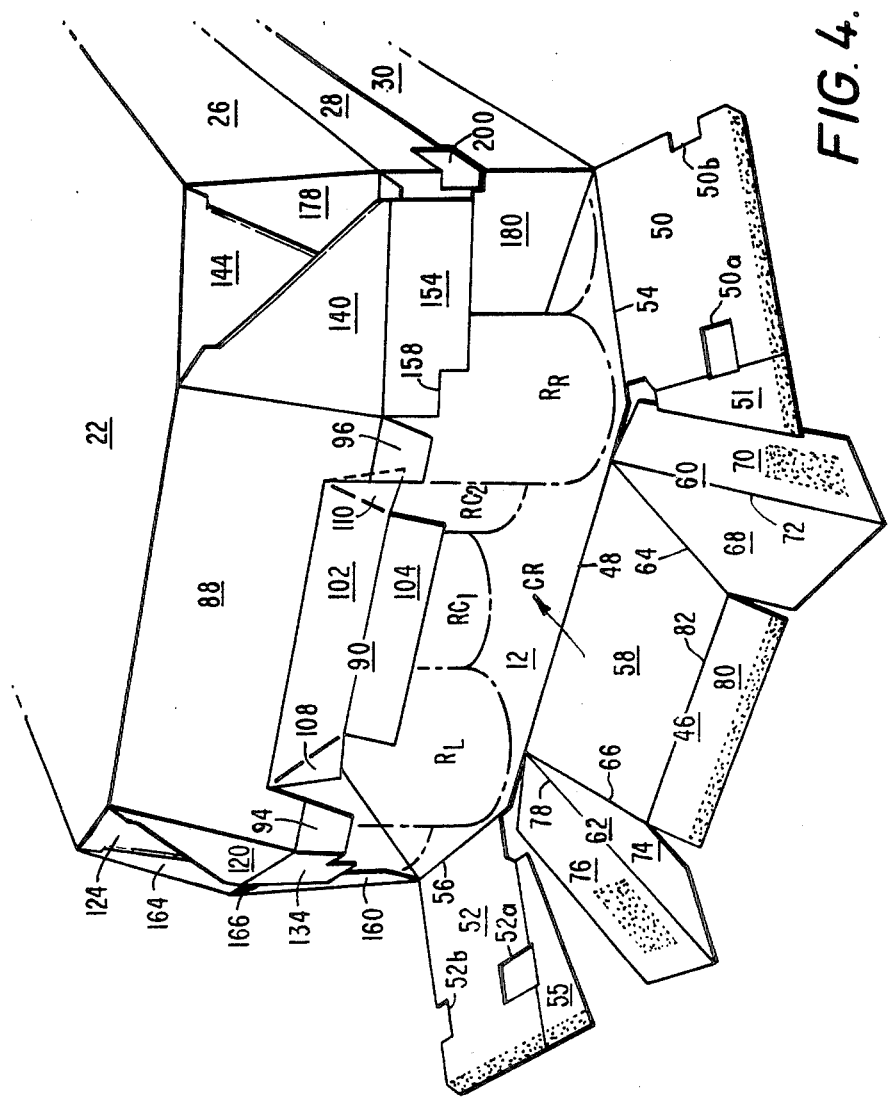
Figure 5:
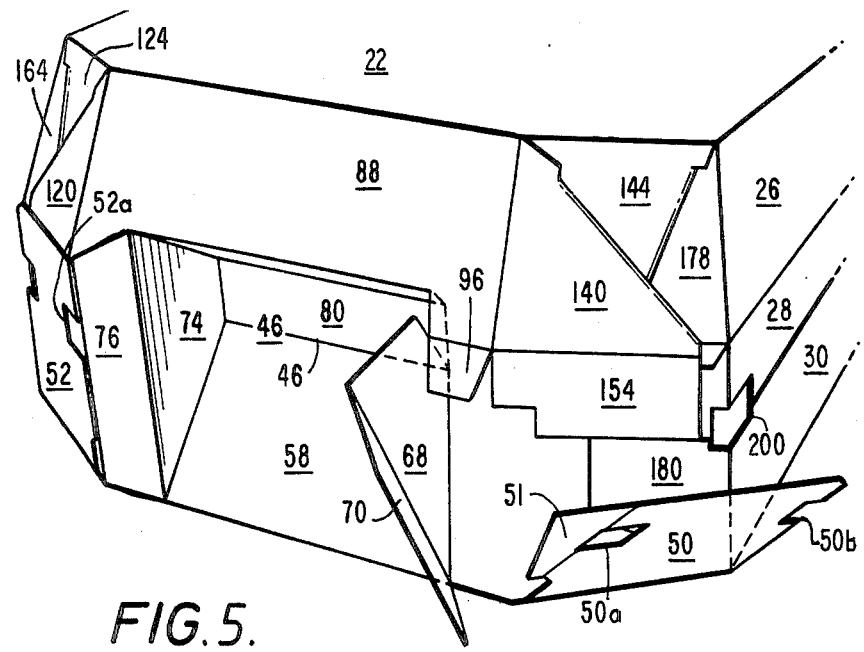
Figure 6:
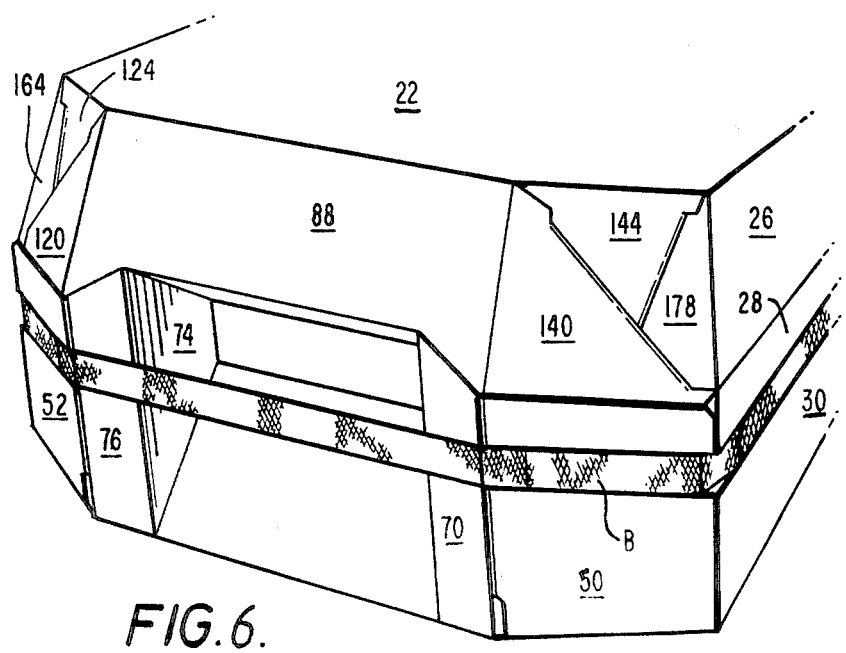

FIGS. 3, 4+5 are perspective views of the carton which show one end of the carton partially closed by the end closure panels; and FIG. 6 is a perspective view of the carton in which one end of the carton is fully closed by the end closure panels.

Figure 2:
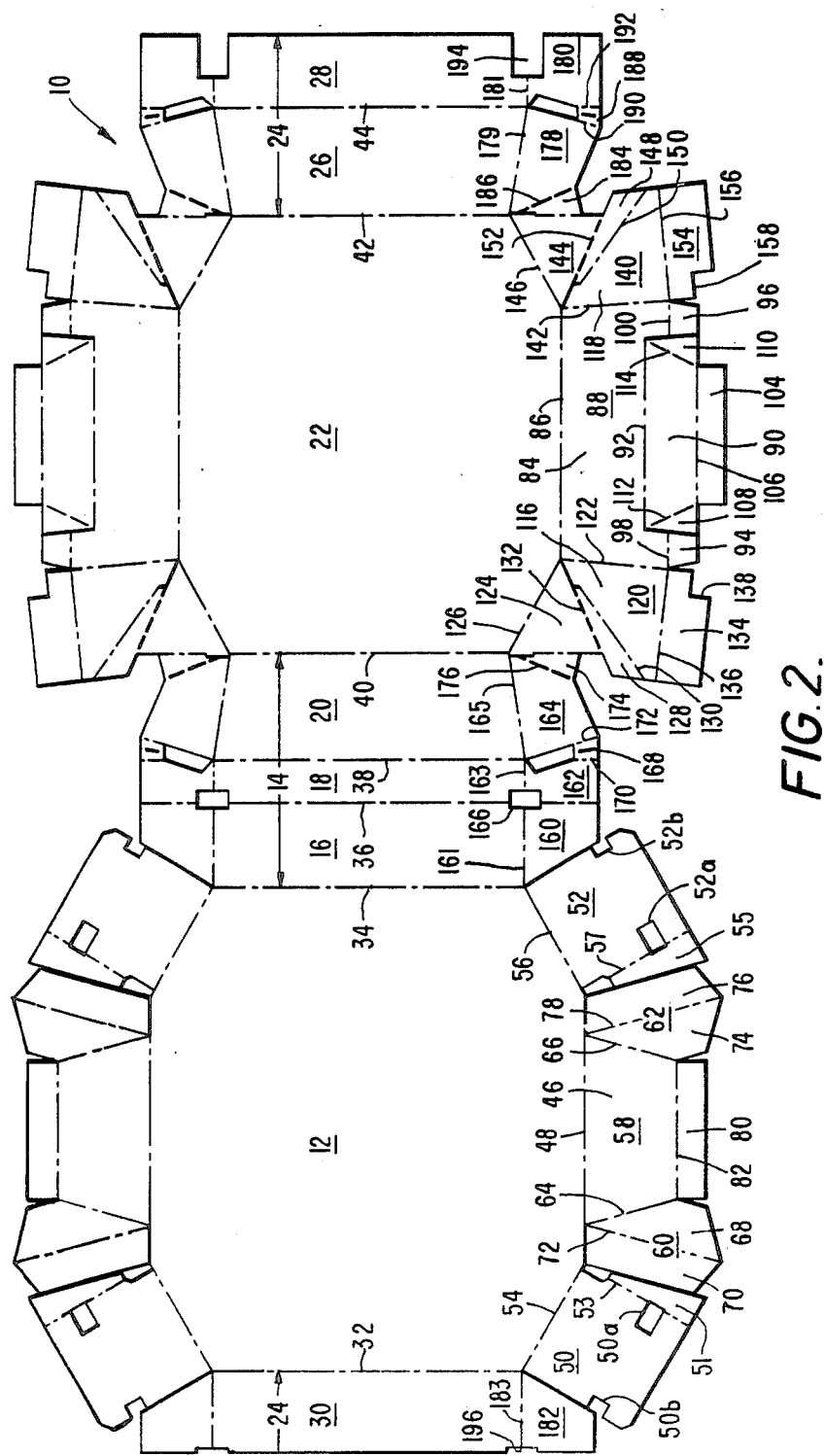
FIG. 2 is a plan view of a blank for forming a carton of the end loading type according to the invention.

Referring first to FIG. 2 of the drawings, an elongate carton blank 10, for forming a polygonal end loading type carton, is formed from paperboard or similar foldable sheet material. The blank comprises, in series, a base panel 12; a first side wall 14 constituted by lower 16, intermediate 18 and upper 20 side wall panels; a top panel 22; a second side wall 24 constituted in part by upper 26 and intermediate 28 side wall panel hinged one to the next along longitudinal fold lines 34–44. A lower side wall panel 30 of the second side wall 24 is hinged to the free edge of base panel 12 along longitudinal fold line 32.

A central bottom end closure panel 46 is hinged to one end edge of base panel 12 centrally along transverse fold line 48. A pair of bottom corner end closure panels 50 and 52 also is hinged to the same end edge of base panel 12 along oblique outwardly divergent fold lines 54, 56 respectively, one on each side of the centrally hinged end closure panel 46. The central bottom end closure panel 46 constituted of an outwardly tapered centre panel 58 and wing panels 60 and 62 hinged to opposed side edges of centre panel 46 along convergent fold lines 64 and 66, respectively.

Wing panel 60 includes a connecting web 68 which is hinged to the centre panel along fold line 64 and a securing flap 70 hinged to the connecting web 68 along line 72. Wing panel 62 is of similar form and includes connecting web 74 hinged to centre panel 46 along fold line 66 and a securing flap 76 hinged to connecting web 78 along fold line 78. Central bottom end closure panel 46 terminates in end flap 80 hinged to centre panel 58 along fold line 82 parallel to fold line 48.

The bottom corner end closure panel 50 has a securing flap 51 hinged thereto along fold line 53 adjacent to but detached from securing flap 70 and is formed with aperture 50a and edge slot 50b. Likewise, corner bottom end closure panel 52 has a securing flap 55 hinged thereto along fold line 57 adjacent to but detached from securing flap 76 and is formed with aperture 52a and edge slot 52b.

A central top end closure panel 84 is hinged to one end edge of top panel 22 along transverse fold line 86. The top end closure panel comprises a main panel portion 88 hinged to top panel 22, a central tuck panel 90 hinged to the free end edge of main panel portion 88 along transverse fold line 92 and a pair of securing tabe 94 and 96 hinged to main panel portion 88 along short fold lines 98, 100 respectively, one on each side of the central tuck panel 90. The central tuck panel 90 includes a mid-part 102 which terminates in an end part 104 foldably joined to mid-part 102 along transverse fold line 106. The mid-part 102 is flanked on each side by one of pair of side tabs 108, 110 hinged to mid-part 102 along crease lines 112, 114 which are convergent toward end part 104.

A pair of top corner end closure panels 116 and 118 respectively is disposed between the end edge of top panel 22 and the central top end closure panel 84 one at each side edge of the main panel portion 88. Top corner end closure panel 116 comprises outer panel 120 hinged to one side edge of main panel portion 88 along fold line 122 and and intermediate panel 124 hinged to top panel 22 along oblique fold line 126. Outer panel 120 and intermediate panel 124 are hinged together by means of a gusset panel 128 along fold lines 130, 132 respectively. Outer panel 120 carries at its free end edge a securing strip 134 hinged thereto along fold line 136 and is formed with an end notch 138. Likewise top corner end closure panel 118 comprises outer panel 140 hinged to one side edge of main panel portion 88 along fold line 142 and an intermediate panel 144 hinged to top panel 22 along oblique fold line 146. Outer panel 140 and intermediate panel 144 are hinged together by means of a gusset panel 148 along fold lines 150, 152 respectively. Outer panel 140 carries at its free end edge a securing strip 154 hinged thereto along fold line 156 and is formed with an end notch 158.

The lower, intermediate and top side wall panels of the first side wall 14 carry a side end closure structure comprising side end closure panels 160,162,164 hinged to lower and intermediate side wall panels 16, 18 and 20 respectively along fold lines 161, 163 and 165.

End closure panel 160 is hinged to end closure panel 162 along an extension of fold line 36 which is interrupted by a slot 166 formed partially in lower and intermediate side wall panels 16, 18 and partially in side end closure panels 160 and 162. End closure panels 162 and 164 are hinged together by a collapsible bridging piece 168 along fold lines 170, 172 respectively. Side end closure panel 164 is hinged to intermediate panel 124 by a gusset panel 174 along fold line 176 and by an extension of fold line 40.

Similarly, the upper, intermediate and lower side wall panels of the second side wall 24 also carry a side end closure structure comprising side end closure panels 178, 180 and 182 hinged to upper, intermediate and lower side wall panels 26, 28 and 30 respectively along transverse fold lines 179, 181 and 183.

End closure panel 178 is hinged to intermediate panel 144 by a gusset panel 184 along fold line 186 and by an extension of fold line 42. End closure panels 178 and 180 are hinged together by a collapsible bridging piece 188 along short fold lines 190 and 192 respectively. End closure panels 180 and 182 are connected together by glueing when the blank is pre-formed into a flat folded condition described shortly.

A notch 194 is cut partially into the free edge of side panel 28 and end panel 180 and a further notch 196 is cut partially into the free edge of side panel 30 and end panel 182 both notches being brought into registry to form an aperture when the carton is pre-formed.

The opposite end of the blank is of similar construction and like parts are designated like reference numerals. The blank is pre-formed in flat folded condition from which it can be erected into a tubular structure, loaded with products and the ends of the tubular structure then closed as described below. In order to pre-form the blank into flat folded condition, intermediate side wall panel 28 is folded about transverse fold line 44 so that it overlies upper side wall panel 26 whereafter an application of glue is made to the exposed marginal edge of the panel 28 and the integral panels 180. Thereafter, the blank is folded about transverse fold line 36 so that the top panel 22 is brought into superposed relationship with base panel 12 and the glued edge of intermediate panel 28 and its dependent end panels is secured to the free edge of lower side wall panel 30 and its dependent end panels. The blank thus pre-formed may then be supplied to a bottler for erecting, loading and finally closing to form the completed carton.

Figure 1:
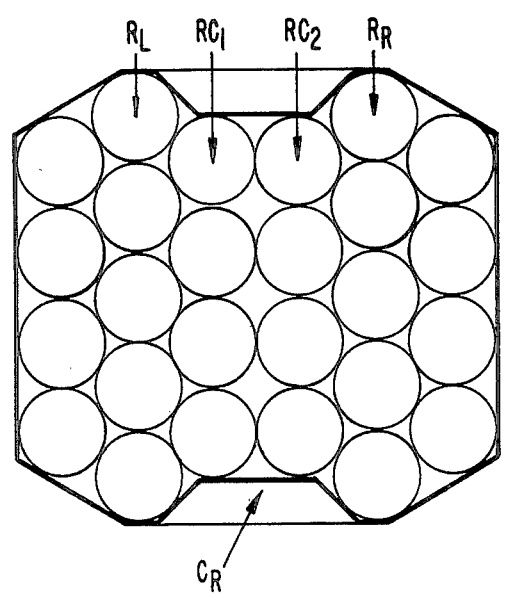
FIG. 1 is a schematic plan view of a carton in which a group of articles are arranged so as to produce a void at each end of the carton.

Once the flat-folded carton has been erected into its tubular form it can be filled with bottles in the configurations shown in FIG. 1, i.e. in which the bottles comprising the centre rows $RC_1$ and $RC_2$ disposed intermediate a pair of adjacent bottles in each of the next adjacent outer rows RL and RR thereby creating a central recess CR at each end of the carton. Each of the ends of the carton is then closed in the following manner.

The top end closure panel is folded downwardly relative to top panel 22 about fold line 86, the initial folding action of which is instigated by displacing inwardly of the tubular structure each of the gusset panels 128, 174; 148, 184. During this folding action, the fold lines 132 and 176 associated with gusset panels 128 and 174 and the fold lines 152 and 186 associated with gusset panels 148 and 184 lead inwardly to bring gusset panels 174 and 184 into overlapping relationship with the underside of the intermediate panels 124 and 144 respectively and to bring gusset panels 128 and 148 into overlapping relationship with the exposed face of those intermediate panels.

This folding action is accompanied by inward folding of the side end panels 160, 162 and 164 and also side end panels 178, 180 and 182 across the open end of the tubular structure relative to their associated side wall panels. During this folding action, both bridging pieces 168 and 188 are displaced inwardly. At the completion of this folding step, securing strip 134 partially overlies both the side end closure panels 160, 162 and securing strip 154 overlies both the side end closure panels 180, 182.

The central tuck panel of 90 is displaced inwardly into the central recess CR so that it slopes inward and downward relative to the main panel portion 88. The side tabs 108, 110 are hinged outwardly as they strike against the endmost bottles in the bottle rows RL and RR. An application of glue is then made to end flap 80 the ends of panels 50, 51; 52, 55 and to both of the securing flaps 70 and 76. Both the bottom end closure panels 50 and 52 are then folded upwardly and adhered to securing flap and tab 154, 96 and to securing flap and tab 134, 94 respectively. In doing so, notch 52b is brought into register with aperture 166 and notch 50b is brought into register with aperture 200 formed by notches 194, 196.

Bottom end closure panel 46 including wing panels 60, 62 is folded upwardly about transverse fold line 48 and the tapered centre panel 58 is displaced inwardly into the central recess CR whereby the wing panels 60 and 62 are flared outwardly of the recess CR. The end flap 80 of centre panel 58 is secured in overlapping relationship to end part 104 of top end closure panel.

When the bottom end closure panel is brought into its upward folded position the securing flap 70 is superposed upon both the side end closure flap 51 and the underlying securing tab 96 and is secured to those panels. Likewise, the opposite securing flap 76 is superposed upon and secured to side end closure flap 55 and the underlying securing tab 94.

With the end closure panels thus secured, the apertures 200, 50a,52a and 166 are aligned about the end of the carton.

Of course, the opposite end of the carton is closed in a like manner. The apertured portions of the end closure panels provide location for a tight-fitting encircling band B applied subsequently to the carton about its midriff. At the ends of the carton, the band provides a handle to facilitate portage of the package and the recessed end construction allows the handle portion of the strap to be grasped more readily than otherwise would be in the absence of the void.

In this carton construction, the top end closure panels and side end closure panels are hinged together by fold lines and gusset panels to facilitate closure of those panels. However, the central bottom end closure panel and the bottom corner end closure panels are not interconnected. This latter arrangement allows the bottom closure panels to be folded downwardly away from the base panel so that they are clear of the end opening of the tubular structure during end loading so as to prevent 'snagging' of the bottles on the bottom closure panels.

I claim:

1. A carton enclosing a group of uniform articles such as bottles or cans disposed in at least three parallel rows and comprising at least one central row and at least two adjacent outer rows of articles arranged in mutually abutting relationship and in which the number of articles in said central row is less than that in said adjacent outer rows whereby a void is formed at each end of said group intermediate said outer rows of articles, the carton comprising a top and base interconnected by spaced side walls thereby forming a tubular structure and end closure panels closing each end of the tubular structure, said end closure panels at each end of the carton comprising a top end closure panel hinged to said top and having a central portion displaced into said void and a bottom end closure panel hinged to said base and having an end flap secure to said top end closure panel within said void, characterized in that said bottom end closure panel is joined to said base along a fold line which is substantially aligned with and tangential to the endmost articles in said adjacent outer rows.

2. A carton according to claim 1, further characterized in that said bottom end closure panel has a central portion which is inwardly and upwardly inclined into said void.

3. A carton according to claim 2, further characterized in that at least one side wall end closure panel is hinged to each end of said side walls.

4. A carton according to claim 3, further characterized in that said bottom end closure panel includes a pair of wing panels hinged to opposed sides of said central panel, said wing panels having securing portions attached to said bottom corner end closure panels.

5. A carton according to claim 4, further characterized in that each of said wing panels comprises a connecting panel hinged to said central panel and to said securing portions of the wing panel said connecting panels being flared outwardly of the void and said securing portions being attached to said bottom corner end closure panels and said top corner end closure panels in superposed relationship to the endmost articles in said adjacent third rows.

6. A carton according to claim 5, further characterized in that said displaced portion of the top end closure panel is inwardly and downwardly inclined into said void and includes hinged tabe which overlie portions of respective ones of the endmost articles in said adjacent outer rows.

7. A carton according to claim 6, further characterized in that said top corner end closure panels are integral with said top end closure panels and said side end closure panels and in that said bottom corner end closure panels are detached from said central bottom end closure panel.

8. A carton according to claim 1, further characterized in that the carton is encircled with a close-fitting band disposed intermediate said top and said base, which band extends across each of the opposite ends of the carton and provides, in the vicinity at which the top and bottom end closure panels are displaced into the void, a readily graspable handle portion.

9. A carton according to claim 2, further characterized in that it includes means for securing other portions of said top- and bottom end closure panels to each other and to said side walls.

10. A carton according to claim 2, further characterized in that it comprises first and second central rows of articles and, disposed on each side of said central rows, adjacent third and fourth rows of articles.

11. A carton according to claim 10, further characterized in that the articles in said first and second central rows are transversely aligned with respect to each other and the articles in said adjacent third rows are nested with the articles in said first and second central rows, respectively, and with the articles in said adjacent fourth rows.

12. A carton according to claim 10, further characterized in that each of said first and second central rows comprises four articles and each of said adjacent third rows has five articles whereas each of said adjacent fourth rows has four articles.

13. A carton according to claim 10, further characterized in that the number of articles in said adjacent fourth rows is less than that of said adjacent third rows and in that said top and base has bevelled corners extending along the outermost articles in said adjacent third and fourth rows.

14. A carton according to claim 13, further characterized in that corner end closure panels are hinged to said bevelled corners of said top and base and secured to each other in overlapping relationship.

* * * * *